(12) United States Patent
Watanabe et al.

(10) Patent No.: US 8,036,662 B2
(45) Date of Patent: Oct. 11, 2011

(54) METHOD AND APPARATUS FOR PERFORMING HANDOFF IN MOBILE NETWORK COMMUNICATION BY IMMEDIATELY TERMINATING A CONNECTION BEFORE CHANGING THE POINT OF ATTACHMENT TO SAVE NETWORK RESOURCES

(75) Inventors: Koji Watanabe, Kokubunji (JP); Hui Deng, Beijing (CN); Yuanchen Ma, Beijing (CN); Peng Yang, Beijing (CN)

(73) Assignee: Hitachi, Ltd., Tokyo (JP)

( * ) Notice: Subject to any disclaimer, the term of this patent is extended or adjusted under 35 U.S.C. 154(b) by 1189 days.

(21) Appl. No.: 11/492,893

(22) Filed: Jul. 26, 2006

(65) Prior Publication Data

US 2007/0086383 A1  Apr. 19, 2007

(30) Foreign Application Priority Data

Oct. 17, 2005  (CN) .......................... 2005 1 0113517

(51) Int. Cl.
*H04M 3/00* (2006.01)
(52) U.S. Cl. ....... 455/436; 455/437; 455/442; 455/41.2; 370/328; 370/331; 370/338
(58) Field of Classification Search ....... 455/432.1–453, 455/464, 509; 370/310.2, 328, 331, 332, 370/338, 341
See application file for complete search history.

(56) References Cited

U.S. PATENT DOCUMENTS

| | | | |
|---|---|---|---|
| 6,549,522 B1 * | 4/2003 | Flynn | 370/313 |
| 6,993,335 B2 * | 1/2006 | Natarajan et al. | 455/437 |
| 2001/0005677 A1 * | 6/2001 | Dempo et al. | 455/436 |
| 2003/0219024 A1 * | 11/2003 | Purnadi et al. | 370/401 |
| 2004/0052238 A1 * | 3/2004 | Borella et al. | 370/349 |
| 2004/0082330 A1 | 4/2004 | Maris | |
| 2004/0117508 A1 * | 6/2004 | Shimizu | 709/249 |
| 2004/0264410 A1 * | 12/2004 | Sagi et al. | 370/331 |
| 2005/0053034 A1 * | 3/2005 | Chiueh | 370/331 |
| 2005/0070280 A1 * | 3/2005 | Jung et al. | 455/434 |
| 2005/0078633 A1 | 4/2005 | Watanabe et al. | |
| 2005/0119001 A1 * | 6/2005 | Watanabe | 455/436 |
| 2006/0084417 A1 * | 4/2006 | Melpignano et al. | 455/418 |

FOREIGN PATENT DOCUMENTS

| | | |
|---|---|---|
| JP | 2004242180 | 8/2004 |
| JP | 2004349834 | 12/2004 |
| JP | 200539317 | 2/2005 |
| JP | 2005159929 | 6/2005 |

* cited by examiner

*Primary Examiner* — Nick Corsaro
*Assistant Examiner* — Babar Sarwar
(74) *Attorney, Agent, or Firm* — Brundidge & Stanger, P.C.

(57) ABSTRACT

A server including: a communication unit for wirelessly communicating with a mobile terminal through one of wireless network gateways; and a processing unit for receiving registration request information from the mobile terminal through the communication unit, executing handoff from one wireless interface to another wireless interface and sending a signal instructing the termination of wireless connection generated by the processing unit to the wireless network gateway through the communication unit to release wireless connection before handoff between the server and the access point when the registration request information indicates the termination of the current wireless connection.

19 Claims, 9 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      TYPE     |S|B|D|M|G|V|rsv|            LIFETIME           |
+-+-+-+-+-+-+-+-+-+-+-+-+-+-+-+-+-+-+-+-+-+-+-+-+-+-+-+-+-+-+-+-+
|                          HOME ADDRESS                         |
+-+-+-+-+-+-+-+-+-+-+-+-+-+-+-+-+-+-+-+-+-+-+-+-+-+-+-+-+-+-+-+-+
|                           HOME AGENT                          |
+-+-+-+-+-+-+-+-+-+-+-+-+-+-+-+-+-+-+-+-+-+-+-+-+-+-+-+-+-+-+-+-+
|                         CARE-OF ADDRESS                       |
+-+-+-+-+-+-+-+-+-+-+-+-+-+-+-+-+-+-+-+-+-+-+-+-+-+-+-+-+-+-+-+-+
|                                                               |
+                          IDENTIFICATION                       +
|                                                               |
+-+-+-+-+-+-+-+-+-+-+-+-+-+-+-+-+-+-+-+-+-+-+-+-+-+-+-+-+-+-+-+-+
|                          C/W EXTENSION                        |
+-+-+-+-+-+-+-+-+-+-+-+-+-+-+-+-+-+-+-+-+-+-+-+-+-+-+-+-+-+-+-+-+
```

| HoA | CoA | IDENTIFICATION | LIFETIME | C/W |
|---|---|---|---|---|
| 192.168.195.1 | 202.3.4.3 | AXCDSFD | 200 | C |
| 192.168.195.7 | 55.1.3.2 | MNEDXD | 144 | W |
| ... | ... | ... | ... | ... |

METHOD AND APPARATUS FOR PERFORMING HANDOFF IN MOBILE NETWORK COMMUNICATION BY IMMEDIATELY TERMINATING A CONNECTION BEFORE CHANGING THE POINT OF ATTACHMENT TO SAVE NETWORK RESOURCES

CLAIM OF PRIORITY

The present application claims priority from Chinese application CN200510113517.2 filed on Oct. 17, 2005, the content of which is hereby incorporated by reference into this application.

BACKGROUND OF THE INVENTION

1. Field of the Invention

The present invention relates to a mobile network communication technique and particularly to a method and apparatus for handoff in mobile network communication.

2. Description of the Related Art

In a wireless communication system, handoff between different systems such as a mobile phone and a wireless local area network (WLAN) is performed according to user's necessity.

Figure 1:
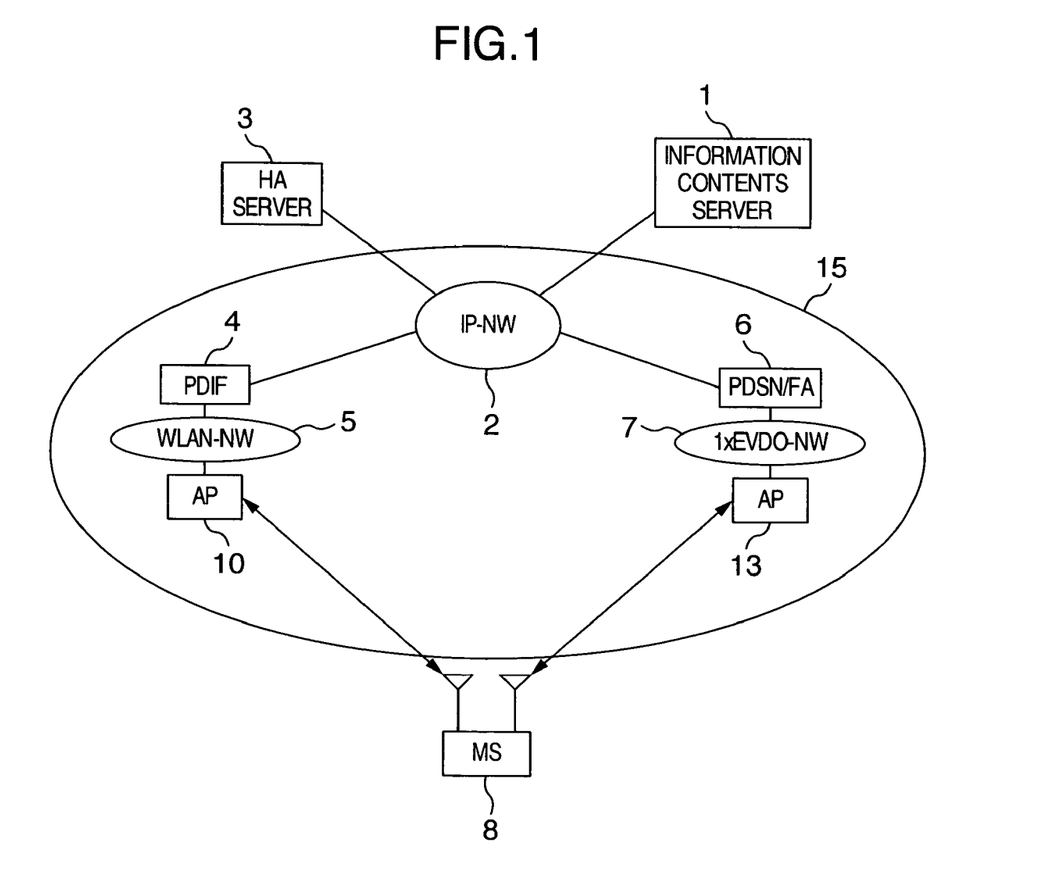
FIG. 1 is a block diagram showing an example of configuration of a wireless communication system concerned with handoff between systems.

FIG. 1 is a view showing an example of configuration of a wireless communication system concerned with handoff between systems. In FIG. 1, the reference numeral 1 designates an information contents server; 2, an IP network; 3, a home agent (HA) server of mobile IP (MIP); 8, a mobile station (MS); 5, a wireless local area network (WLAN) provided by a WLAN service provider; 4, a gateway (PDIF: Packet Data Inter-working Function) to the WLAN; 10, a WLAN access point (AP); 7, a mobile phone system (1×EvDO: 1× Evolution Data Only) network provided by a 1×EvDO service provider; 6, a gateway (PDSN: Packet Data Serving Node) to the 1×EvDO network; 13, a 1×EvDO access point (AP); and 15, a stationary network.

When the MS 8 needs to change the 1×EvDO access point to the WLAN access point or when the MS 8 needs to change the WLAN access point to the 1×EvDO access point, the MS 8 sends mobile IP registration information to the home agent HA and asserts a new PPP (Point to Point Protocol) session between the gateway PDIF/FA as a target and itself. If the old PPP session between the gateway PDSN and the MS at that time were held so continuously as not to be cleared until timeout, not only would a great deal of resources become wasteful but also there would be a bad influence on access to other mobile stations. In addition, as a more serious problem, a user must pay an excessive fee even though the network has been already changed to another wireless network.

U.S. Patent Application Publication 2004/0082330A has proposed a method for warranting handoff by using mobile IP between a wireless LAN (WLAN) and a third generation (3G) network. In the proposed method, it was possible to warrant handoff in one direction from the WLAN to the 3G network but it was impossible to warrant handoff in a reverse direction. This is because this proposed method gave no consideration about how to release network side not-yet-changed resources after changing the network.

That is, in the proposed method, when the MS changes one gateway to another wireless LAN gateway, the MS sends mobile IP registration information to the home agent HA and asserts a new PPP session between the gateway PDIF/FA as a target and itself. If the old PPP session between the gateway before handoff and the MS were held so continuously as not to be cleared until timeout, not only would a great deal of resources become wasteful but also there was a bad influence on access to other mobile stations. As a more serious problem, the user must pay an excessive fee.

In the process in which CDMA 1×EvDO is changed to the WLAN, the MS performs registration in the home agent through the PDIF again. The method about how to cut off PPP connection, that is, which of the MS and the PDSN cuts off PPP connection, has never been proposed.

If PPP connection is cut off by the MS, the PDSN sends deregistration information to the home agent. There is however a possibility that error may be caused by the home agent's deletion of registration information in the MS even in the case where the deregistration information reaches to the home agent so that the MS is registered in the home agent through the WLAN.

SUMMARY OF THE INVENTION

An object of the present invention to provide a method and apparatus for handoff in a mobile network communication, in which when a user changes one gateway to another gateway, connection to the gateway before handoff is cut off immediately to thereby make it possible to save network resources.

According to an embodiment of the present invention, a server connected to a network in a wireless communication system is provided for accomplishing the object. The wireless communication system includes a mobile terminal with wireless interfaces, access points each communicating with the mobile terminal through one of the wireless interfaces so as to be connected to the network, and wireless network gateways each having one side connected to the server and the other side connected to corresponding one of the access points. The server includes a communication unit for wirelessly communicating with the mobile terminal through one of the wireless network gateways, and a processing unit for receiving registration request information from the mobile terminal through the communication unit and executing handoff from one wireless interface to another wireless interface. The processing unit sends a signal instructing the termination of wireless connection generated by the processing unit to the wireless network gateway through the communication unit to release wireless connection before handoff between the server and the access point when the registration request information indicates the termination of the current wireless connection.

Other objects, features and advantages of the invention will become apparent from the following description of the embodiments of the invention taken in conjunction with the accompanying drawings.

DETAILED DESCRIPTION OF THE INVENTION

An embodiment of the invention will be described with reference to the accompanying drawings.

FIG. 1 is a view showing network topology of handoff between a CDMA 1×EvDO network and a wireless LAN. As shown in FIG. 1, a mobile station MS performs registration in the CDMA 1×EvDO network through an access point AP and a gateway PDSN. The gateway PDSN has a foreign agent (FA) function. The mobile station can also perform registration in a wireless LAN (WLAN) through an access point AP and a gateway PDIF. The gateway PDIF also has a foreign agent (FA) function. An AAA (Authentication Authorization and Accounting) server not shown in FIG. 1 serves as a RADIUS (Remote Authentication Dial-In User Service) server for chiefly performing authentication and accounting of the mobile station.

Various kinds of wireless interfaces such as W-CDMA and Blue-tooth as well as CDMA 1×EvDO and wireless LAN may be used as network interfaces in this invention.

Figure 2:
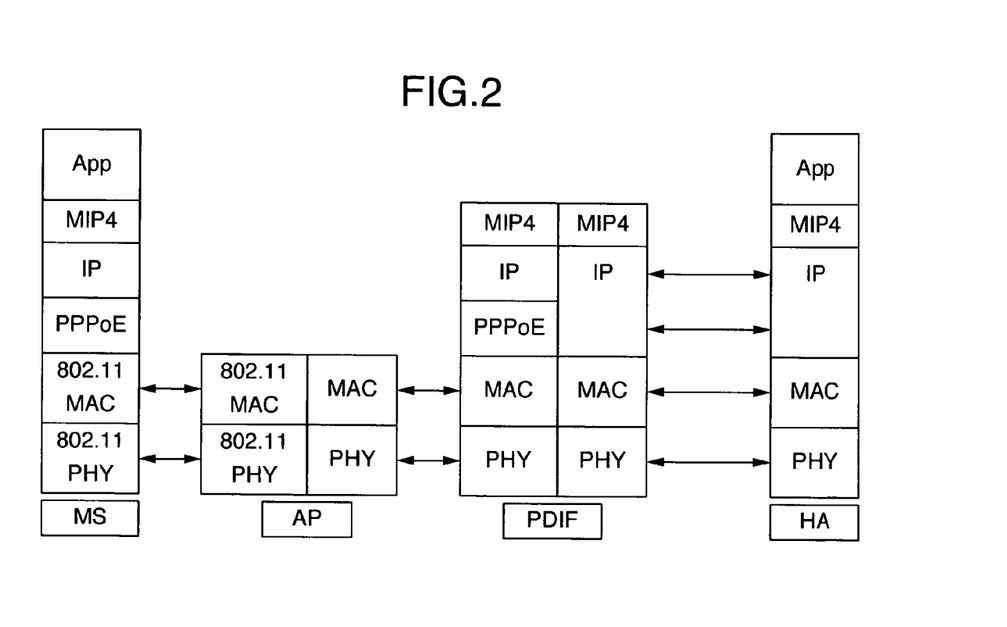
FIG. 2 is a view showing a mobile IP signal process in a wireless LAN (WLAN) in the present invention.

A web site "3rd Generation Partnership Project 2" is a good guide to control signals and data processes for CDMA 2000 1×EvDO. FIG. 2 is a view showing control signal protocol stacks on the WLAN side. The mobile station supports PPPoE (Point to Point Protocol over Ethernet) and performs authentication through the AAA server. Mobile IP protocol stacks which support an application layer of the mobile station performs handoff between the 3G network and the WLAN. The WLAN access point is only a layer-2 network device, so that a flow of all control signals and data are open to the AP.

On the other hand, the gateway PDIF terminates PPPoE and supports authentication. This is because the PDIF has a function of a foreign agent which can communicate with the home agent on the basis of mobile IP information.

Figure 3:
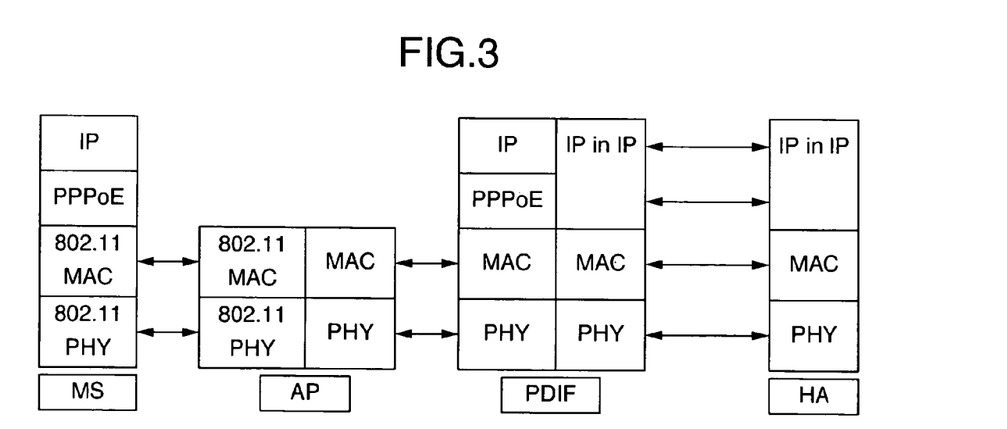
FIG. 3 is a view showing a flow of data in the wireless LAN (WLAN) in the present invention.

FIG. 3 is a view showing data flow protocol stacks on the WLAN side. Data are transmitted between the PDIF and the home agent HA through IP in IP tunnels, so that the data finally reach the mobile station.

When the mobile station changes the 1×EvDO network to the wireless LAN side, PPP connection between the PDSN and the mobile station is continued until the PPP connection is cut off by timeout, unless the mobile station dynamically cuts off the PPP connection.

In this invention, mobile IP registration request information RRQ sent from the mobile station to the home agent HA is extended to thereby indicate the current wireless connection of the mobile station and notify the home agent HA of the interruption of PPP connection.

Figure 4:
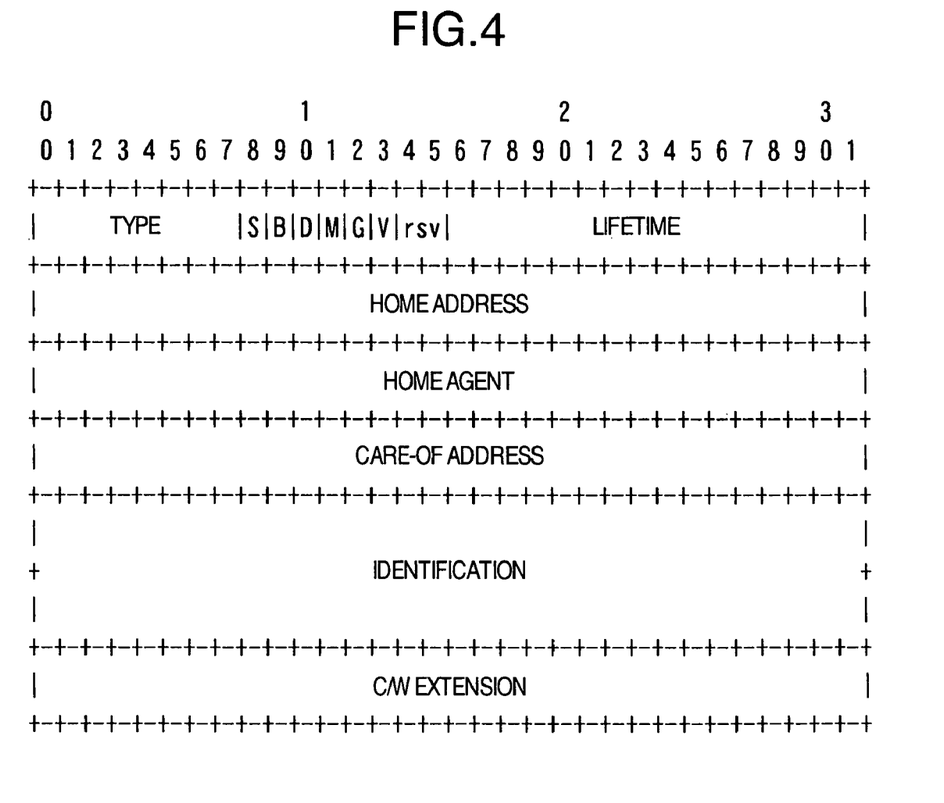
FIG. 4 is a schematic view showing C/W extension in mobile IPv4 registration request information in the present invention.

FIG. 4 is a schematic view of mobile IPv4 registration request information including a C/W extension field. The signal shown in FIG. 4 contains items and extended items such as type, duration, local address, home agent, care of address, identification, etc. In this invention, extended contents shown in FIG. 5 are used as definitions of extended items.

Figure 5:
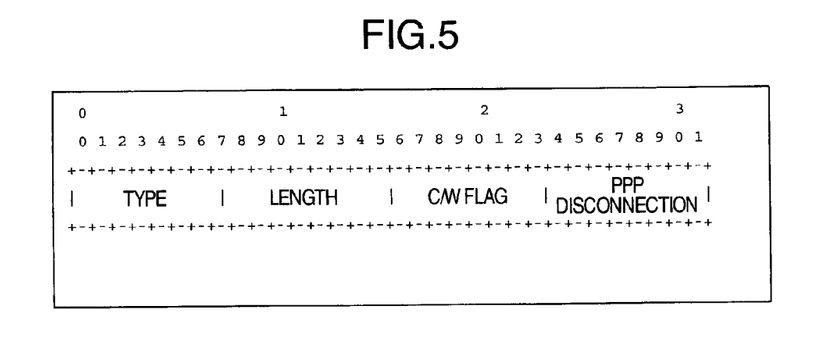
FIG. 5 is a schematic view showing contents of C/W extension in the mobile IPv4 registration request information in the present invention.

FIG. 5 is a schematic view showing contents of the C/W extension field in the mobile IPv4 registration request information (FIG. 4) according to the invention. In FIG. 5, the "Type" means a numerical value such as 149, the "Length" means a length expressed by a numerical value such as 16, the "C/W Flag" means mark bits such as 8 bits, and the "PPP Disconnection" means the mobile station's requirement for PPP disconnection. In this embodiment, "C" in "C/W Flag" means a CDMA network, and "W" in "C/W Flag" means a wireless LAN. The "C" and "W" are not limited thereto and may mean other networks. When PPP disconnection is asserted, the home agent HA needs to notify the PDSN of the mobile station's requirement for PPP disconnection. The "PPP Disconnection" is only one example. The "PPP Disconnection" may be replaced by a selection item such as "Stop of Accounting" or "Release of Resources".

Figure 6:
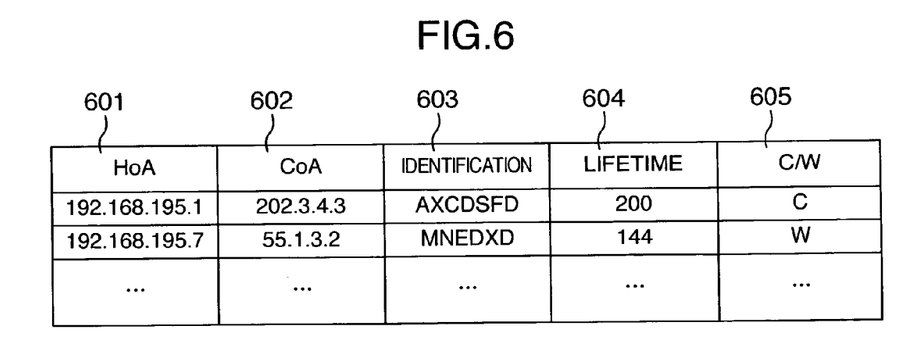
FIG. 6 is a registration table in a home agent in the present invention.

Next, a registration table for the home agent HA will be described with reference to FIG. 6. Each record of the registration table includes a home address HoA 601, a care-of-address CoA 602, an identification 603, and a Lifetime 604, which belong to the mobile station to be registered. Each record of the registration table is registered according to the mobile IPv4 registration request which format is shown in FIG. 4. On this embodiment, the mobile IPv4 registration table is extended so that the home agent HA is notified of whether the current registration is derived from the CDMA 2000 1×EvDO network or from the wireless LAN. The "C/W" flag 605 is added to the registration table, so that registration is performed while classified into the CDMA 2000 1×EvDO network and the wireless LAN with the character "C" or "W".

Figure 7:
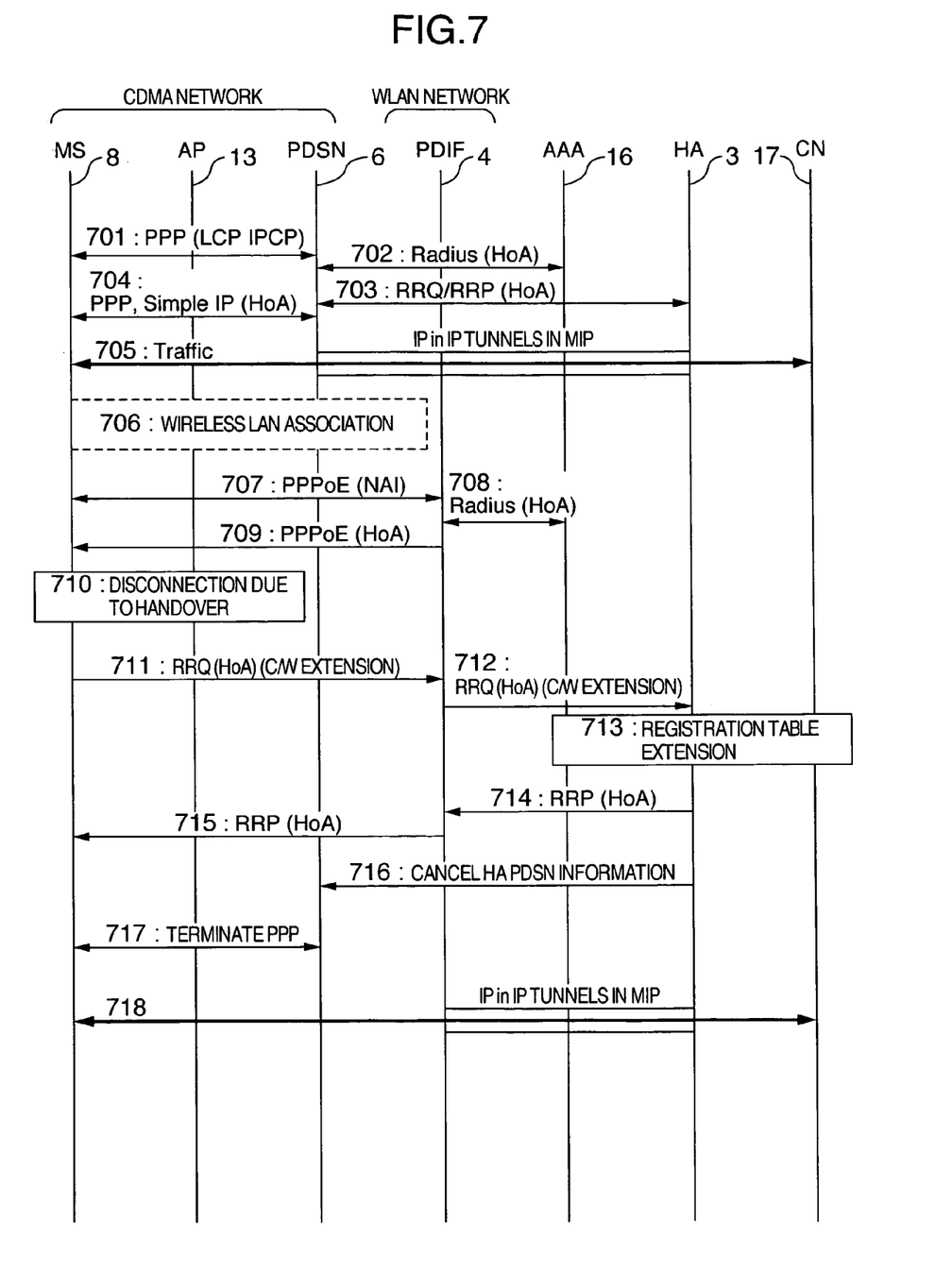
FIG. 7 is a signal process for handoff between a CDMA 2000 1×EvDO network and a wireless LAN.

FIG. 7 is a view showing a control signal process for handover between the CDMA 2000 1×EvDO network and the wireless LAN. First, the mobile station 8 starts PPP connection to the gateway PDSN 6 (701). The gateway PDSN 6 allocates a home address HoA to the mobile station 8 through authentication by the AAA server 16 on the basis of NAI (Network Access Identifier) information of the mobile station 8 (702). At the same time, the gateway PDSN 6 performs registration in the home agent HA 3 by using the home address HoA of the mobile station 8 and the IP address of itself (703 and 704). In this manner, data sent from a correspondent node 17 (CN not shown in FIG. 1) to the mobile station 8 pass through the mobile IP tunnel between the gateway PDSN 6 and the home agent HA 3 and reach the mobile station 8 (705).

As the mobile station 8 comes into a wireless LAN region (706), the mobile station 8 first performs negotiation with the wireless LAN access point AP 13. The user can acquire basic information such as fee, bandwidth, signal strength, service quality, etc. from the wireless LAN side on the basis of this negotiation. After the negotiation between the mobile station 8 and the gateway PDIF 4, the mobile station 8 acquires the same home address HoA from the AAA server 16 in order to obtain network PPPoE access authentication by using the same mobile station NAI (707, 708 and 709).

When the user decides a network to be connected in accordance with the user's situation, that is, when, for example, connection to the wireless LAN is decided (710), the mobile station 8 sends RRQ information with new C/W extended options proposed by this invention to the gateway PDIF 4 for the wireless LAN (711). Upon reception of the information, the home agent HA 3 changes the network connection from "C" to "W" in accordance with its own registration table information (712 and 713) and sends the RRQ information back to the mobile station 8 through the gateway PDIF 4 (714 and 715). Then, the home agent HA 3 sends HA-FA (Home Agent—Foreign Agent) information and notifies the gateway PDSN 6 of the requirement for the termination of PPP connection (716 and 717).

Finally, the data flow is sent to the mobile station 8 through the tunnel between the home agent HA 3 and the gateway PDIF 4 (718).

The functional block configuration of each device in this invention will be described below.

Figure 8:
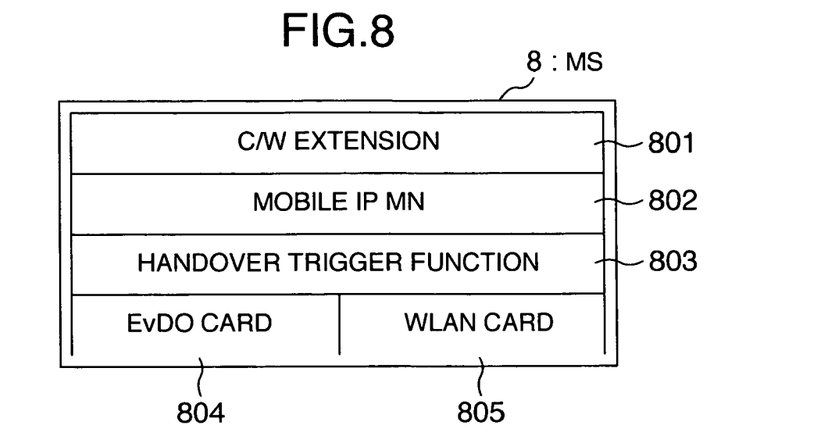
FIG. 8 is a view showing a basic function of a mobile station.

FIG. 8 is a view showing functional blocks of the mobile station 8. The mobile station 8 is a dual mode terminal which has an EvDO card 804 used for 1×EvDO connection, and a wireless LAN card 805 used for wireless LAN connection. A handover trigger function 803 is an option for deciding whether the user performs handoff or not, and which wireless connection is used. The Mobile IP MN (Mobile Node) 802 is the mobile IP function for the mobile station 8. The mobile station 8 needs to support the C/W extension function 801 of the mobile IP.

Figure 9:
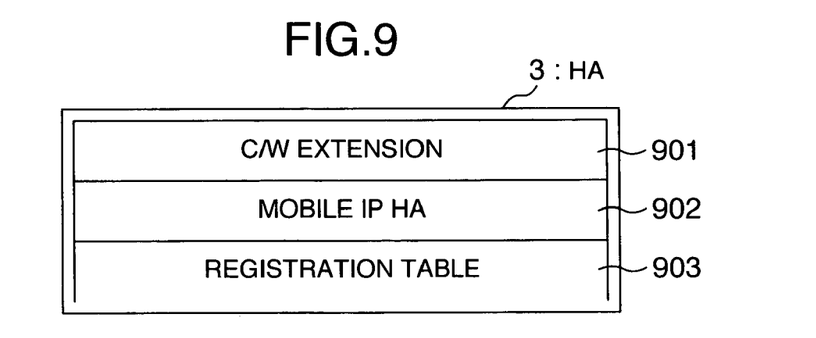
FIG. 9 is a view showing a basic function of the home agent.

FIG. 9 is a view showing functional blocks of the home agent HA 3. The C/W extension of the home agent registration table permits the judgment as to which wireless network is currently connected with the home agent, that is, the judgment as to which of 1×EvDO or wireless LAN is used currently. At the same time, the home agent 3 must support the C/W extended options of the mobile IP as the C/W extension function 901. The Mobile IP HA (Home Agent) 902 is the mobile IP function for the HA3. The Registration Table 903 is a basic registration table of the Mobile IP. Finally, the home agent 3 notifies the gateway PDSN 6 of the requirement for PPP disconnection.

Figure 10:
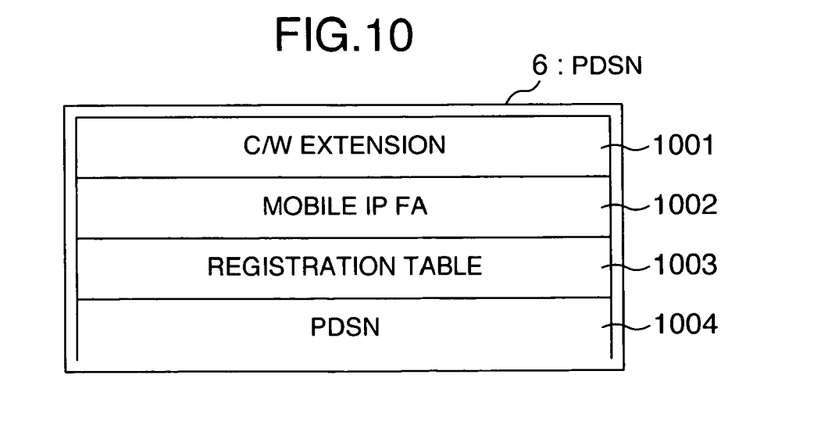
FIG. 10 is a view showing a basic function of PDSN.

FIG. 10 is a view showing functional blocks of the gateway PDSN 6. The PDSN 1004 is a basic function of the PDSN 6. Besides basic functions, C/W extension must be supported by the gateway PDSN 6 as the C/W extension function 1001 so that the gateway PDSN 6 communicates with the home agent HA 3 in order to find whether the mobile station 8 is connected through the CDMA network or whether registration is performed through the wireless LAN. The PDSN 1004 must support HA-FA information so that PPP connection with the mobile station is cut off on the basis of the HA-FA information. The Mobile IP FA (Foreign Agent) 1002 is the mobile IP function for the PDSN 6. The Registration Table 1003 is a basic registration table of the Mobile IP.

Figure 11:
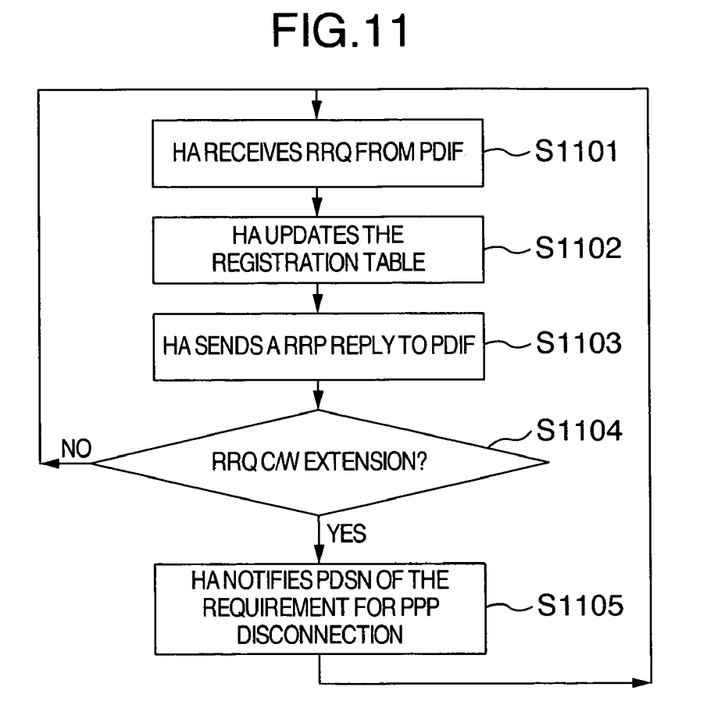
FIG. 11 is a flow chart showing a control process after the home agent receives RRQ information from PDIF.

FIG. 11 is a flow chart showing a control process in the home agent HA 3. The process corresponds to sequence from 711 to 714 of FIG. 7. After the home agent HA 3 receives RRQ information through the gateway PDIF 4 (S1101), the home agent HA 3 updates its own registration table (S1102) and sends standard RRP back to the gateway PDIF 4 (S1103). Then, the home agent HA 3 makes a decision on the basis of the C/W extended options as to whether the gateway PDSN 6 is notified of the requirement for PPP disconnection or not (S1104). If the C/W extended option is "W" (means yes), the home agent HA 3 notifies the gateway PDSN 6 of the requirement for PPP disconnection (S1105).

Figure 12:
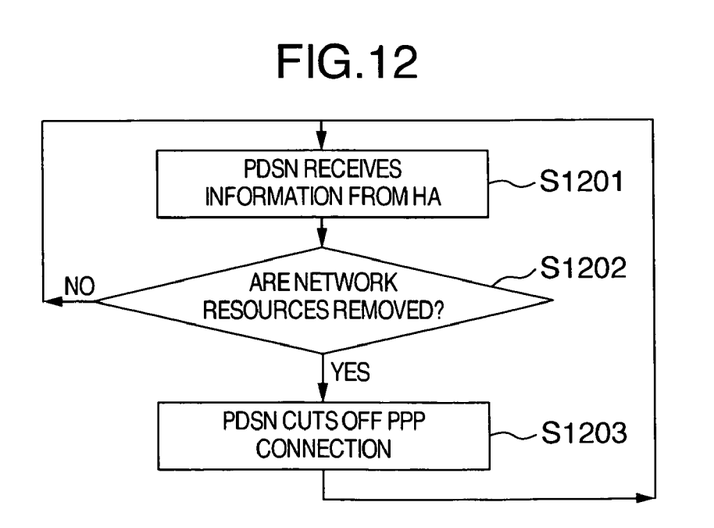
FIG. 12 is a flow chart showing a control process after PDSN receives RRP.

FIG. 12 is a flow chart showing a control process in the gateway PDSN 6. The process corresponds to sequence from 716 to 717 of FIG. 7. After the gateway PDSN 6 receives registration information from the home agent HA 3 (S1201), the gateway PDSN 6 first judges based on the received registration information whether network resources are to be deleted or not (S1202). When, for example, the judgment is "Yes" in the case of PPP, PPP connection is cut off (S1203). When the information is invalid, the gateway PDSN ignores the information.

Figure 13:
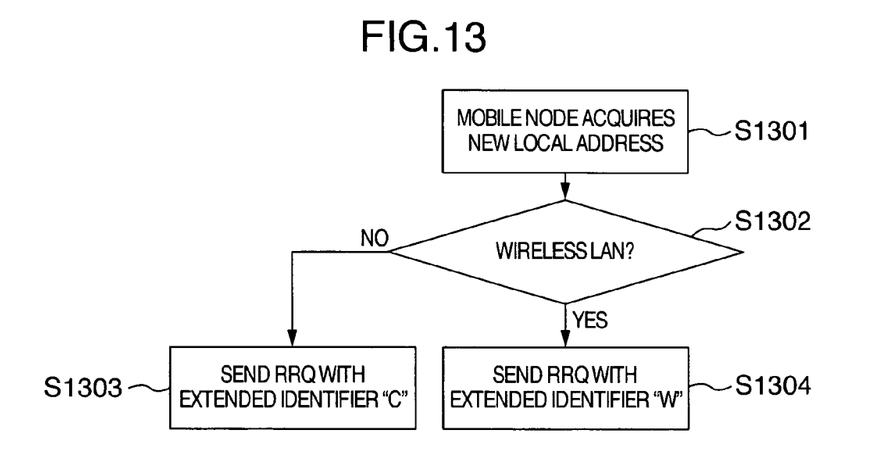
FIG. 13 is a flow chart showing a control process in which the mobile station sends RRP.

FIG. 13 is a flow chart showing a control process in the mobile station 8. The process corresponds to sequence 711 of FIG. 7. When the mobile station 8 sends RRQ information (S1301), the mobile station 8 first judges by, for example, the handover trigger function whether the mobile station is currently connected to the wireless LAN or to the 3G network (S1302). When the mobile station 8 is currently connected to the wireless LAN, "W" is identified in this extended option (S1304). When the mobile station is currently connected to the CDMA (3G) network, "C" is identified in this extended option(S1303). At the same time, the RRQ with the C/W extended option is sent from the mobile station 8 (S1303, S1304). The RRQ with the C/W extended option works to release (delete) the network resouces (such as ppp connection) assigned to the mobile station 8 before the handover.

Figure 14:
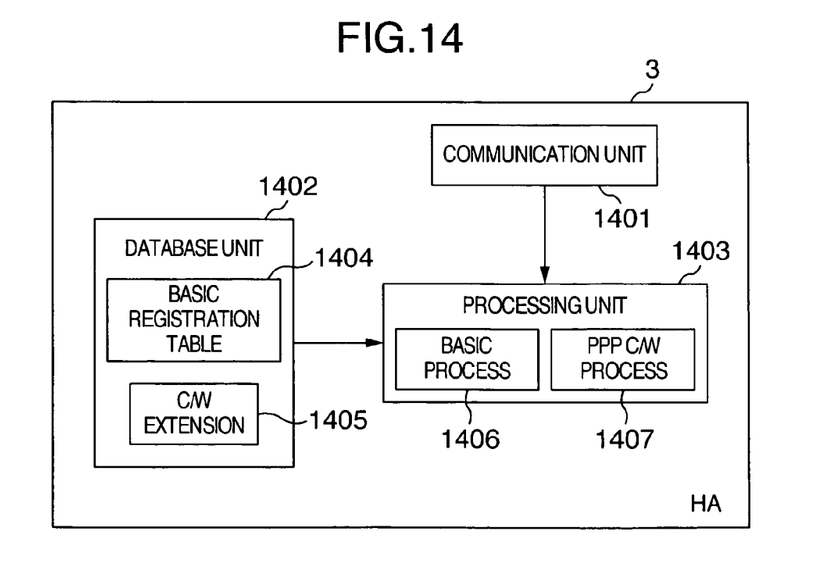
FIG. 14 is a block diagram showing the configuration of the home agent HA.

FIG. 14 is a block diagram showing the configuration of the home agent HA 3. The home agent HA 3 includes a communication unit 1401, a processing unit 1403, and a database unit 1404. Of these units, the communication unit 1401 receives handoff request information from the mobile station 8 and performs handoff from one wireless interface to another wireless interface. For example, the request information has an extension for specifying the termination of connection between the network side server and the access point before handoff. A process executed by the processing unit contains a basic process 1406, and a PPP C/W process 1407. Upon detection of received information, the communication unit 1401 generates a signal and notifies the wireless network gateway of the requirement for the interruption of wireless connection. Accordingly, the processing unit 1403 can process the PPP disconnection request and add a C/W connection identifier, etc. to the registration table. The database unit 1402 includes a basic registration table 1404 and a C/W extension table 1405. General communication data are stored in the basic registration table 1404. The registration table of the home agent HA shown in FIG. 6 is stored in the basic registration table 1404 and the C/W extension table 1405.

Figure 15:
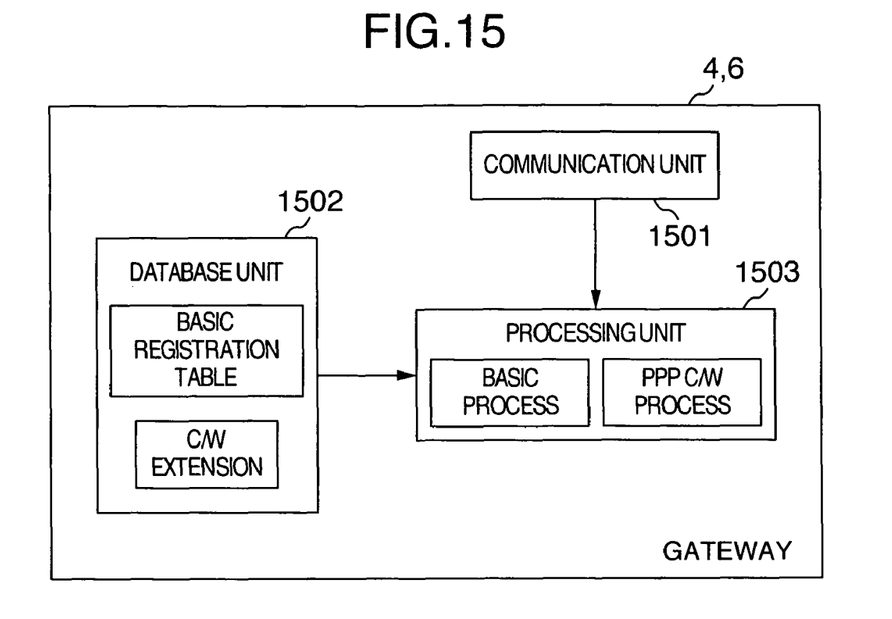
FIG. 15 is a block diagram showing the configuration of the wireless gateway.

FIG. 15 is a block diagram showing the configuration of the gateway 4 and 6. The gateway includes a communication unit 1501, a processing unit 1503, and a database unit 1502. The functions of the respective units are like those of the home agent HA 3. In addition thereto, the processing unit 1503 can execute a PPP disconnection process and delete network resources of the mobile station 8 assigned before handover.

Figure 16:
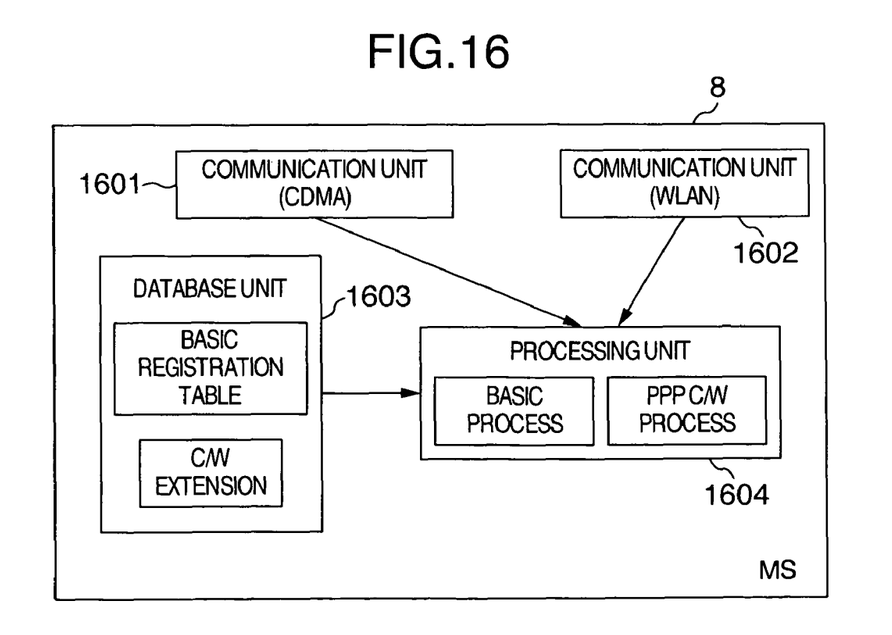
FIG. 16 is a block diagram showing the configuration of the mobile station.

FIG. 16 is a block diagram showing the configuration of the mobile station 8. The mobile station 8 includes two types of communication units 1601 and 1602, a processing unit 1604, and a database unit 1603. The functions of the respective units are like those of the home agent HA. In addition thereto, the processing unit 1604 can add an extended function, inclusive of a request for the deletion of network resources of the home agent before handoff such as a PPP session, into the mobile IP registration information and add a 3G/WLAN network connection identifier to the registration table of the home agent.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A server connected to a network in a wireless communication system including a mobile terminal with wireless interfaces, access points each communicating with the mobile terminal through one of the wireless interfaces so as to be connected to the network, and wireless network gateways each having one side connected to the server and the other side connected to corresponding one of the access points, the server comprising:
 a communication unit for wirelessly communicating with the mobile terminal through one of the wireless network gateways and one of the access point;
 a table for storing registration information of the mobile terminal and an identifier indicating through which wireless interface of the mobile terminal registration request information is transmitted; and
 a processing unit for receiving registration request information from the mobile terminal through the communication unit to execute switching of the wireless network gateway used for communicating with the mobile terminal generating, when the registration request information includes an instruction of extended options for instructing termination of the wireless connection before executing said switching, a signal instructing the termination of connection between the mobile terminal and the wireless network gateway before executing said switching by referring to the identifier stored in the table and information to send the generated signal to the wireless network gateway before executing said switching through the communication unit to release the wireless connection between the mobile terminal and the wireless network gateway before executing said switching.

2. A server according to claim 1, wherein the signal instructs the cutting off of Point to Point Protocol (PPP) connection between the mobile terminal and the gateway.

3. A server according to claim 1, wherein the registration request information has extended options used for indicating the termination of the current wireless connection.

4. A server according to claim 1, wherein the wireless network interfaces are Code Division Multiple Access (CDMA) 2000 1×Evolution Data Optimized (EvDO), wireless Local Area Network (LAN), Wideband Code Division Multiple Access (WCDMA), and Blue-tooth.

5. A mobile terminal in a wireless communication system including a server, the mobile terminal with wireless interfaces, access points each communicating with the mobile terminal through one of the wireless interfaces so as to be connected to a network, and wireless network gateways each having one side connected to the server and the other side connected to corresponding one of the access points, the mobile terminal comprising:
 the wireless interfaces;
 and a processing unit used for generating registration request information for executing switching from a first wireless interface to a second wireless interface to send the registration request information to the server via the second wireless interface,
 wherein the registration request information includes an instruction of extended options for instructing disconnection of a wireless connection between the first wireless interface and the wireless network gateway connected to the first wireless interface.

6. A mobile terminal according to claim 5, wherein the extended options instruct the cutting off of PPP connection between the mobile terminal and the gateway.

7. A mobile terminal according to claim 5, wherein the wireless network interfaces are CDMA 2000 1×EvDO, wireless LAN, WCDMA, and Blue-tooth.

8. A mobile terminal according to claim 5, wherein the processing unit judges network connection information of the currently registered mobile terminal on the basis of a table which is stored in a database unit in the mobile terminal and in which registration information and an identifier indicating the wireless network interface concerned with the current registration are stored.

9. A gateway in a wireless communication system including a mobile terminal with wireless interfaces, access points each communicating with the mobile terminal through one of the wireless interfaces so as to be connected to a network, and wireless network gateways each having one side connected to a server and the other side connected to corresponding one of the access points, the gateway comprising:
 a communication unit through which the mobile terminal wirelessly communicates with the server; and
 a processing unit for terminating wireless connection between the mobile terminal and a wireless network gateway used for communicating with the mobile terminal when a signal for the termination of the wireless connection between the mobile terminal and the wireless network gateway is received from the server through the communication unit.

10. A gateway according to claim 9, wherein the instruction instructs the cutting off of PPP connection between the mobile terminal and the gateway.

11. A gateway according to claim 9, wherein the mobile terminal sends registration request information to the gateway and the registration request information has extended options used for indicating the termination of the current wireless connection.

12. A gateway according to claim 9, wherein the wireless network interfaces are CDMA 2000 1×EvDO, wireless LAN, WCDMA, and Blue-tooth.

13. A wireless communication system comprising:
 a server;
 a mobile terminal with wireless interfaces;
 access points each communicating with the mobile terminal through one of the wireless interfaces so as to be connected to a network; and
 wireless network gateways each having one side connected to the server and the other side connected to corresponding one of the access points;
 the server including:
 a communication unit for wirelessly communicating with the mobile terminal through one of the wireless network gateways, and one of the access points;
 a table for storing registration information of the mobile terminal and an identifier indicating through which wireless interface of the mobile terminal a registration request information is transmitted; and
 a processing unit for receiving the registration request information from the mobile terminal through the communication unit to execute switching of the wireless network gateway used for communicating with the mobile terminal and generating, when the registration request information includes an instruction of the termination of the wireless connection before executing the switching, a signal instructing termination of connection between the mobile terminal and the wireless network gateway before executing the switching by referring to the identifier stored in the table and information in the registration request information to send the generated signal to the wireless network gateway before executing the switching through the communication unit to release the wireless connection between the mobile terminal and the wireless network gateway before executing the switching;
 the mobile terminal including:
 the wireless interface; and
 a processing unit used for generating the registration request information for executing switching from a first wireless network interface to a second wireless network interface to send the registration request information to the server via the second wireless interface, wherein the registration request information includes extended options for instructing disconnection of a wireless connection between the first wireless interface and the wireless network gateway connected to the first wireless interface;

each of the gateways including:

a communication unit for wirelessly communicating with the mobile terminal; and a processing unit for terminating wireless connection between the mobile terminal and the gateway used for communication with the mobile terminal when an instruction for the termination of the wireless connection the mobile terminal and the gateway is received from the server through the communication unit.

14. A wireless communication system according to claim 13, wherein the registration request information has extended options used for indicating the termination of the current wireless connection.

15. A wireless communication system according to claim 13, wherein the wireless network interfaces are CDMA 2000 1×EvDO, wireless LAN, WCDMA, and Blue-tooth.

16. A method of handing off wireless interfaces of a mobile terminal in a wireless communication system including the mobile terminal with the wireless interfaces, access points each communicating with the mobile terminal through one of the wireless interfaces so as to be connected to a network, and wireless network gateways each having one side connected to the server and the other side connected to corresponding one of the access points, said method comprising:

storing in a table registration information of the mobile terminal and an identifier indicating through which wireless interface of the mobile terminal a registration request information is transmitted;

generating, by the mobile terminal, registration request information with extended options for instructing termination of connection between the server and the access point;

upon reception of the registration request information from the mobile terminal executing, by the server, switching of the wireless network gateway used for communicating with the mobile terminal and generating, when the registration request information includes an instruction of the termination of the wireless connection before executing the switching, a signal instructing the termination of connection between the mobile terminal and the wireless network gateway before executing the switching by referring to the identifier stored in the table and information in the registration request information to send the generate signal to the wireless network gateway before executing the switching through the communication unit to release the wireless connection between the mobile terminal and the wireless network gateway before executing the switching; and instructing, by the signal, the cutting off of PPP connection between the server and the gateway.

17. A method according to claim 16, wherein the wireless network interfaces are CDMA 2000 1×EvDO, wireless LAN, WCDMA, and Blue-tooth.

18. A wireless communication system comprising:

the mobile terminal with wireless interfaces;

access points each communicating with the mobile terminal through one of the wireless interfaces so as to be connected to a network; an wireless network gateways each having one side connected to the server and the other side connected to corresponding one of the access points, wherein the mobile terminal generates the registration request information for executing switching from a first wireless interface to a second wireless interface to send the registration request information to the server via the second wireless interface, wherein the registration request information includes extended options for instructing disconnection of a wireless connection between the first wireless interface and the wireless network gateway connected to the first wireless interface;

upon reception of the registration request information from the mobile terminal, the server executes switching of the wireless network gateway used for communicating with the mobile terminal and generating, when the registration request information includes an instruction of termination of the wireless connection before executing the switching, a signal instructing the termination of connection between the mobile terminal and the wireless network gateway before executing the switching by referring to the identifier stored in the table and information in the registration request information to send the generated signal to the wireless network gateway before executing the switching through the communication unit to release the wireless connection between the mobile terminal and the wireless network gateway before executing the switching.

19. A method of handing off wireless interfaces of a server set in a wireless communication system including a mobile terminal with wireless interfaces, access points each communicating with the mobile terminal through one of the wireless interfaces so as to be connected to a network, and wireless network gateways each having one side connected to the server and the other side connected to corresponding one of the access points, said method comprising:

generating, by wherein the mobile terminal, registration request information for executing switching from a first wireless interface to a second wireless interface to send the registration request information to the server via the second wireless interface, wherein the registration request information includes extended options for instructing disconnection of a wireless connection between the first wireless interface and the wireless network gateway connected to the first wireless interface upon reception of the registration request information from the mobile terminal executing, by the server, switching of the wireless network gateway used for communicating with the mobile terminal and generating, when the registration request information includes an instruction of termination of the wireless connection before executing the switching, a signal instructing the termination of connection between the mobile terminal and the wireless network gateway before executing the switching by referring to the identifier stored in the table and information in the registration request information to send the generated signal to the wireless network gateway before executing the switching through the communication unit to release the wireless connection between the mobile terminal and the wireless network gateway before executing the switching; and stopping, by the wireless network gateway, the wireless connection between the server and the access point communicating with the mobile terminal.

* * * * *